(12) United States Patent
Hill

(10) Patent No.: US 7,314,455 B1
(45) Date of Patent: Jan. 1, 2008

(54) AUTOMOBILE CAR SEAT MASSAGE DEVICE

(76) Inventor: Sylvester B. Hill, 112 Harvard Ave., #156, Claremont, CA (US) 91711

( * ) Notice: Subject to any disclaimer, the term of this patent is extended or adjusted under 35 U.S.C. 154(b) by 65 days.

(21) Appl. No.: 11/341,024

(22) Filed: Jan. 27, 2006

(51) Int. Cl.
*A61H 1/00* (2006.01)

(52) U.S. Cl. ............... 601/57; 601/49; 601/112; 297/391

(58) Field of Classification Search ............ 601/46, 601/49, 56–61, 69, 70, 78, 84, 87, 90, 91–93, 601/97, 98, 100, 101, 102, 103, 112, 113; 297/217.3, 391
See application file for complete search history.

(56) References Cited

U.S. PATENT DOCUMENTS

| | | | |
|---|---|---|---|
| 4,203,098 A | 5/1980 | Muncheryan | |
| D319,105 S | 8/1991 | Cheng | |
| 5,188,096 A | 2/1993 | Yoo | |
| 5,348,370 A | 9/1994 | Fukuoka | |
| 5,411,468 A * | 5/1995 | Chen | ............ 601/57 |
| 6,077,238 A | 6/2000 | Chung | |
| 6,087,942 A | 7/2000 | Sleichter, III et al. | |
| 6,524,263 B2 | 2/2003 | Chen | |
| 6,676,615 B2 * | 1/2004 | Flick et al. | ............ 601/57 |

FOREIGN PATENT DOCUMENTS

JP            401034366 A   *   2/1989

* cited by examiner

*Primary Examiner*—Quang D. Thanh
(74) *Attorney, Agent, or Firm*—Lawrence J. Gibney, Jr.

(57) ABSTRACT

This is a device to provide massaging stimulus to a driver of an automobile. Massaging heads are installed in the headrest of the car or truck or any moving vehicle to provide stimulus to the base of the skull or the back of the neck of the driver in order to insure that the driver remains alert.

5 Claims, 4 Drawing Sheets

AUTOMOBILE CAR SEAT MASSAGE DEVICE

STATEMENT REGARDING FEDERALLY SPONSORED RESEARCH

Not Applicable

CROSS REFERENCES TO RELATED APPLICATIONS

Not Applicable

REFERENCE TO APPENDIX

Not Applicable

BACKGROUND OF THE INVENTION

A. Field of the Invention

The present invention relates to a device, which helps to keep the driver of an automobile awake. The present invention further relates to a device, which is integrated into the seat of an automobile and is operable by touching buttons located in reachable locations within the automobile.

B. Prior Art

Prior art exists related to providing stimulus to the driver of an automobile or a massaging action to the driver of an automobile. Examples of this are Muncheryan U.S. Pat. No. 4,203,098, Sleichter, III et al. U.S. Pat. No. 6,087,942, and Fukuoka U.S. Pat. No. 5,348,370. However, the present invention is a novel structure of an automobile massaging invention.

BRIEF SUMMARY OF THE INVENTION

The present invention is a massaging system integrated into an automobile's seat to keep a driver awake and alert. The device is comprised of a massaging device, control units, a timer, and electrical connection wires.

The portion of the device that provides the massaging action is positioned in the automobile headrest. The massaging action is accomplished by a series of massaging heads that have been placed in the headrest.

During normal operation this device would provide direct massaging action to the base of the skull and neck area of a driver. The frequency and duration of the massaging action can be directly controlled by the driver of a vehicle by a series of controls, which are located in the interior of the car.

Additionally, a means to provide hot and cold massaging action is also provided. This may be accomplished by allowing an air conditioning mist emitted from the massaging heads.

It is an object of this device to provide a means to stimulate a driver of a car or truck or any moving vehicle to insure that the driver remains alert and awake during any trip.

NUMBERING REFERENCES

Figure 1:
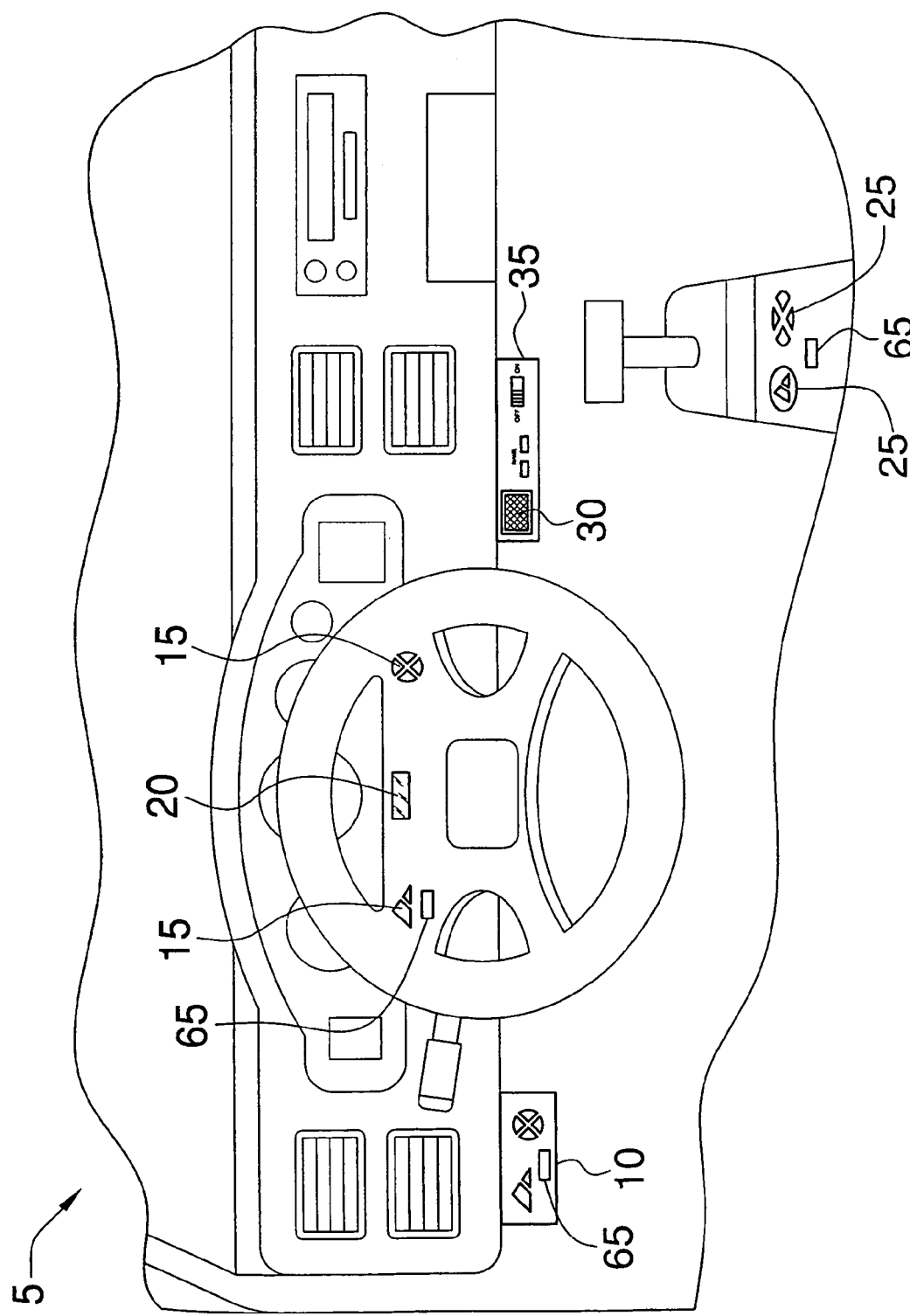
FIG. 1 is a fragmented front view of control area for the driver of a car.

5 Device
10 Control Pad
15 Control Buttons
20 LED Display
25 Control Pad
30 Speaker
35 Control Panel
40 Massaging System
42 Vehicle Seat
44 Headrest
45 Massaging Heads
46 Wires
47 Massaging Head Reciprocating Solenoid
48 Mounting Flange
50 Seat Padding
52 Massaging Unit Foam Covering
54 Bearing
56 Flanged rotating member
58 Motor Shaft and Gear
60 Massaging Head Rotating Motor
65 Cooling mechanism button

DETAILED DESCRIPTION OF THE EMBODIMENT

The present invention is a device 5 that provides stimulating, massaging action to a driver of an automobile. The device 5 consists of a massaging system 40 integrated into the headrest 44 of an automobile seat 42. The massaging system 40 is connected to a control pad 10, which may be located on the dashboard. Control buttons 15, which are located on the steering wheel face or gear shifter allow the operator of the vehicle to operate the system. Appropriate wiring 46 is provided to make the necessary electrical connections.

An LED display 20 will be integrated into the steering wheel and will be illuminated to inform the driver that the massaging system 40 is activated.

A speaker 30 is an option that the driver may use to project a voice for added effectiveness in trying to remain alert and awake. The user can pre-program a message or install a warning siren or beep to alert the driver.

Figure 2:
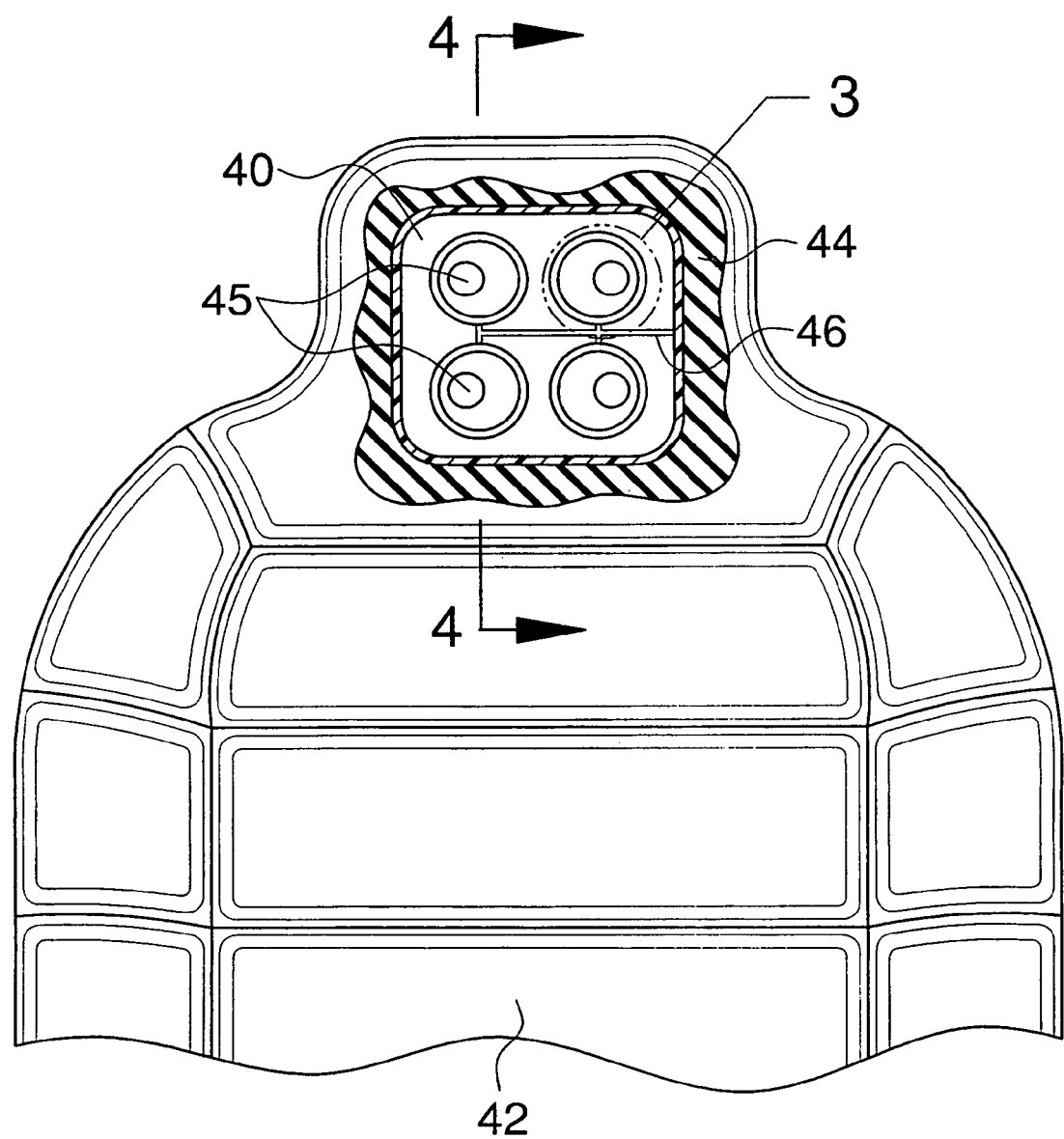
FIG. 2 is a fragmented front view of the interior of a car seat headrest.
Figure 3:
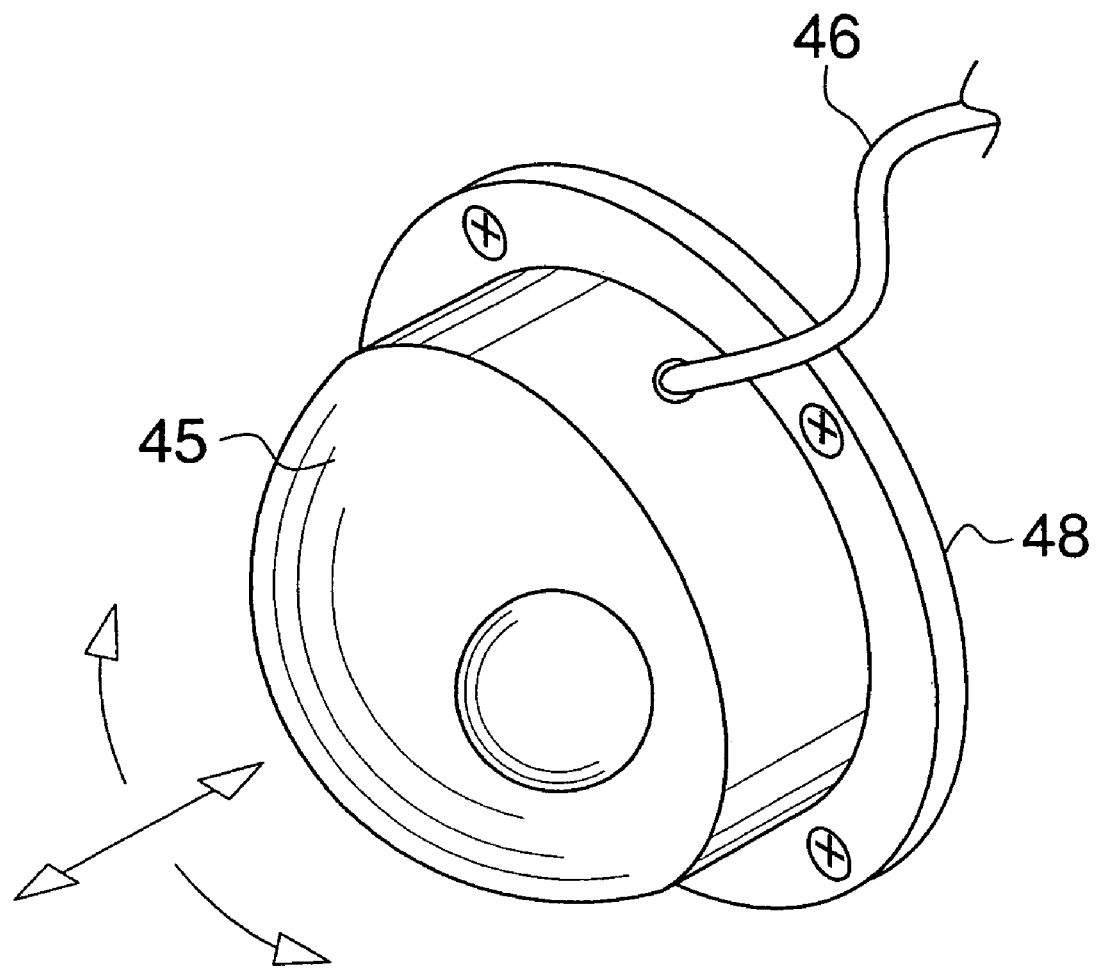
FIG. 3 is an isometric view of one of the massaging heads.
Figure 4:
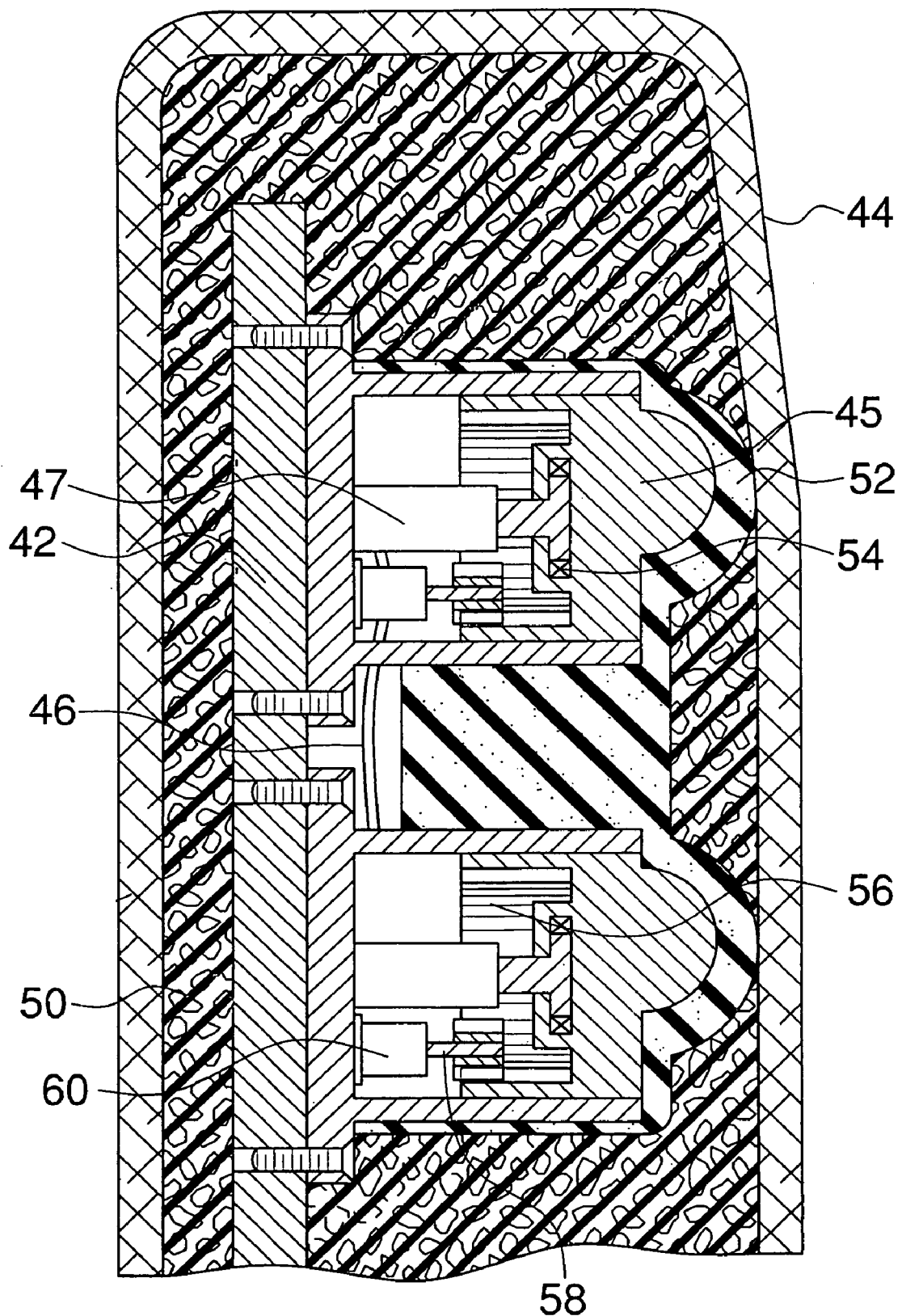
FIG. 4 is a view according to line 4-4 on FIG. 2.

The massaging system 40 will consist of a plurality of massaging heads 45 which will move in a comfortable manner and direction to massage the back of the head of a driver, near the base of the neck. FIGS. 2,3 The massaging heads 45 will be allowed to rotate in a vertical as well as a horizontal direction. The specific direction of rotation will be controlled by a control button, which is located in the interior of the car. Creating this motion and powering the massaging heads 45 will be a reciprocating solenoid 47, bearing 54, motor shaft 58 and gear 56 and a motor 60 to power the gear assembly. The massaging heads 45 through the operation of these various parts of the system will be capable of moving in and out at the desired levels and pressures, as well as rotating. FIG. 4

The reciprocating solenoid 47 is in contact with the massaging head and provides a linear movement of the massaging head in a horizontal direction relative to the position of the individual's neck and head and will provide a certain type of massaging activity. The exact distance that the reciprocating solenoid will move is predetermined and most likely pre-set. FIG. 4

The motor 60 will turn a motor shaft 58 which is connected to a gear 56. As this motor turns, it will produce a rotational movement of the massaging head in a vertical and a horizontal directions relative to the person's head and neck. FIG. 4

The exact movement of the massaging heads 45 may be controlled by a preset, which has been designed into the system or can be individually controlled by the individual within the interior of the car or truck. An on/off switch on a control panel 35 will allow the system to be turned off and on as desired or may be preset to turn off automatically. FIG. 1

The massaging system 40 will be mounted in a cavity in the car seat in the seat padding 50 through the use of a mounting flange 48. A means to secure the flange will be provided; the means to secure will be a plurality of screws. In addition, each massaging head 45 will be covered by foam padding 52 to provide comfort during the massaging action. It is anticipated that the shape of the massaging head 45 will be semi-circular for the maximum effect and maximum comfort of the user. FIG. 4

The controls of the device 5 will allow the user to position the massaging heads 45 to move in the direction up, down, left, and right as well as vary the speed of the massaging action. Although the system can be customized for the individual needs and tastes, the system is designed to produce a beeping noise or voice message every minute until the automatic shut-off point of three minutes or other desired interval.

Further, the system will provide a means to cool or heat the massaging heads. The default will be set on cool. The system to heat or cool the massaging heads is not depicted but will be controlled by a button in the interior of the car or truck. It is likely that the means to heat and cool will be controlled by a rheostat, which can vary the temperature of the massaging heads. Other means to regulate the temperature may also be employed. In order to be able to control the means to heat or cool the heat/cool control 65 will be placed on the steering wheel. Like the rest of the system the heating and cooling systems help to insure that the driver remains awake and alert during any trip.

The invention claimed is:

1. A device for massaging and stimulating a tired driver of an automobile comprising:
   a. operating control buttons;
   wherein the control buttons are placed in desired locations inside the interior of an automobile;
   wherein the control buttons allow the user to turn a massaging unit on and off;
   wherein a plurality of operating control buttons permit the operation of various parts of the device;
   b. a massaging unit;
   wherein the massaging unit is comprised of a plurality of massaging heads;
   wherein the massaging heads are inserted into a cavity in the headrest of the automobile;
   wherein a layer of foam is provided to provide relief to the user and to hide from view the plurality of massaging heads;
   wherein the massaging unit is electrically wired to the control buttons;
   wherein the motion of the massaging heads are controlled by the plurality of control buttons;
   c. reciprocating solenoid;
   wherein a reciprocating solenoid is provided;
   wherein appropriate electrical connections are provided between the reciprocating solenoid, the control buttons and the massaging head;
   wherein the reciprocating solenoid is in contact with the massaging head and provides a linear movement of the massaging head in a horizontal direction relative to the person's head and neck while sitting in the automobile
   d. motor;
   wherein a motor provides rotation for a gear assembly;
   wherein appropriate electrical connections are provided for the control buttons and the motor;
   wherein the motor is connected through a gear to the massaging heads and provides a rotational movement of the massaging head in a vertical and a horizontal directions.

2. The device described in claim 1 wherein the device automatically turns off after a predetermined period.

3. The device as described in claim 1 further comprising a noise producing speaker;
   wherein the speaker produces a desired message or beep to alert the user.

4. The device as described in claim 3 wherein the speaker emits the sound of a human voice.

5. The device as described in claim 1 wherein the massaging heads are semi-circular.

* * * * *